May 2, 1961 F. SANTORO 2,982,560
CHASSIS MECHANISM FOR WHEELED VEHICLES
Filed Jan. 14, 1959 3 Sheets-Sheet 1

INVENTOR
FRANK SANTORO
BY

ATTORNEY

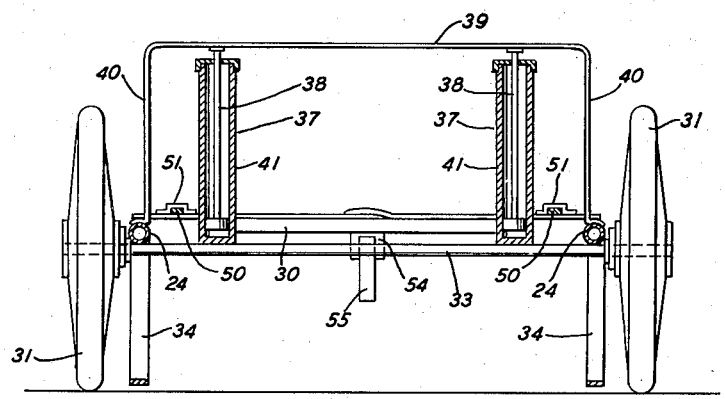
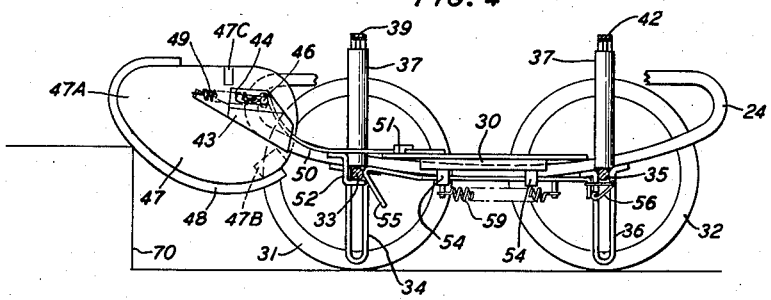
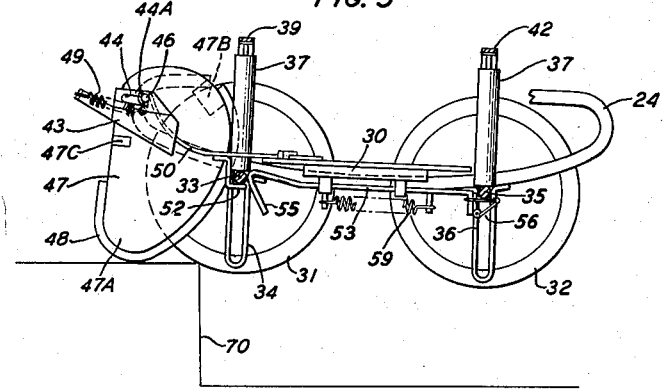

May 2, 1961     F. SANTORO     2,982,560
CHASSIS MECHANISM FOR WHEELED VEHICLES
Filed Jan. 14, 1959     3 Sheets-Sheet 3
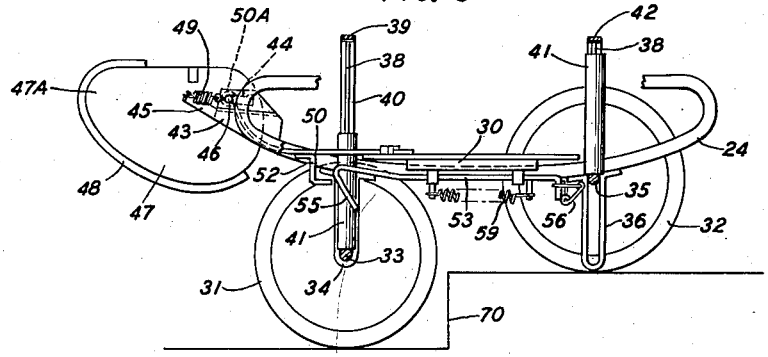
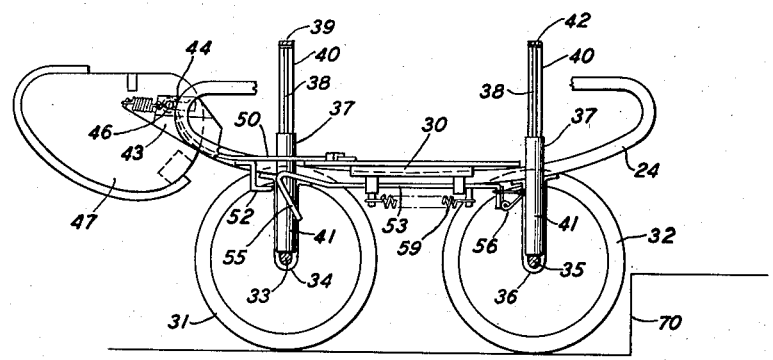
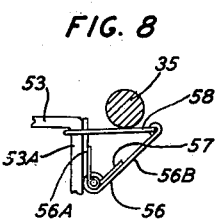
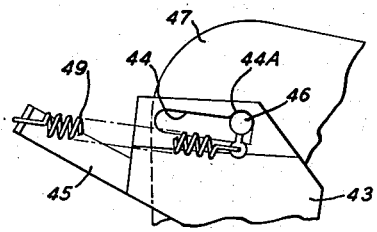
INVENTOR
FRANK SANTORO
BY
*ATTORNEY*

United States Patent Office 2,982,560
Patented May 2, 1961

2,982,560

CHASSIS MECHANISM FOR WHEELED VEHICLES

Frank Santoro, 4590 Park Ave., New York 58, N.Y.

Filed Jan. 14, 1959, Ser. No. 786,816

7 Claims. (Cl. 280—5.28)

This invention relates to wheeled vehicles, and more particularly to vehicles in the nature of baby carriages, strollers, wheel barrows, hand trucks, push carts, etc., having an improved undercarriage arrangement adapted to facilitate ascending and descending street curbs or the like.

Considerable difficulty is generally encountered, for example by a mother in wheeling a baby carriage up and down curbs or other raised obstructions. Maneuvering the carriage up and down such curbs by the mother is generally accomplished only after much tilting, jarring and bumping of the carriage and baby. Not only are these maneuvers difficult for the mother to effect, but they are quite disturbing to the infant, particularly when the infant is asleep.

Prior efforts have been made to overcome the foregoing difficulties by appropriately designing the undercarriages of wheeled vehicles. However, the known undercarriage constructions for facilitating the wheeling of vehicles up and down curbs required a manually operated means, generally in the form of a hand lever or operator, which had to be actuated before the vehicle was rendered operative to accomplish the intended function. This manual manipulation for rendering the prior constructions operative merely complicated the operation of the carriage and per se the construction thereof is relatively complex and expensive.

An object of this invention is to provide an improved undercarriage construction by which wheeling a vehicle of the types above identified either up or down a curb is entirely automatic.

Another object is to provide an undercarriage mechanism which at all times is prepared for either ascending or descending a curb.

Still another object is to provide an improved chassis or undercarriage arrangement in wheeled vehicles of the above mentioned types which tends to maintain the body portion of the vehicle substantially horizontal with minimum of effort on the part of the vehicle propellant while the vehicle is being rolled from a lower level to a higher level, or vice versa.

The foregoing and other, objects, features and advantages are attained by the instant invention by having the undercarriage include a chassis having a front and rear set of wheels connected thereto for movement between a raised and a lowered position and having a pair of transversely aligned bumper cams slidably and rotatably mounted on the front end of the chassis. According to my invention, the bumper cams are pivoted about an auxiliary axle slidably mounted on the chassis, the cams being rendered operative automatically upon engagement of the cam periphery with a curb as the vehicle, for example a baby carriage, is rolled thereagainst. Means are connected to the cam for releasably locking the front wheels in a raised position, when the cams are rendered operative, by a rearward sliding movement of the cam axle. The rotation of the eccentric cams, as the carriage is further rolled, automatically raises the front of the wheeled carriage up to substantially the level of the curb. Means actuated by the front wheels in the raised position automatically but releasably lock the rear wheels in the elevated position so that with a minimum of effort a mother may raise the rear of the carriage with the rear wheels locked, up to the level of the curb. With the front and rear wheels rolling on the elevated level surface, the bumper cams automatically return to their original position, thereby unlocking the front wheels. The front wheels are thus readied to drop to a lower position as the carriage is rolled to the edge of a curb or raised surface in preparation for descending to a lower surface. The rear wheel locking means, being normally biased to a pre-operated position, automatically release the rear wheels upon the automatic lowering of the front wheels. Thus, the rear wheels are free to move to a lower position as the carriage is rolled over a curb.

A further feature of my invention resides in the provision of piston actuated means for moving the wheels between the raised and lower positions.

My invention will more readily be understood from the following illustrative embodiment thereof in the form of a baby carriage when read in conjunction with the appended drawing, in which:

Fig. 3 is a sectional end view taken along line 3—3 of Fig. 2;

Fig. 4 is a fragmentary side view illustrating the relative position of the parts as the carriage is rolled against a curb;

Fig. 5 is a side view illustrating the position of the parts as the front end of the chassis is automatically raised to the level of a curb;

Fig. 6 illustrates the position of the carriage as it is partially descended from a raised to a lower position;

Figure 7 illustrates the position immediately upon the descend of the rear wheels;

Fig. 8 is a fragmentary enlarged detail view of the releasably locking rear wheel means; and Fig. 9 is a fragmentary enlarged detail of the eccentric cam pivotal connection during operation of the cams.

Figure 1:
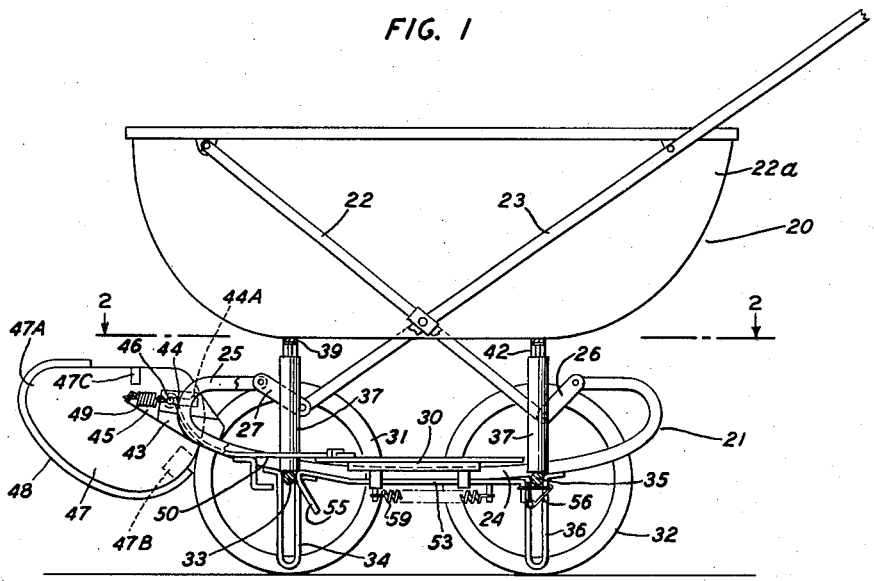
Fig. 1 is a side view in elevation of the improved chassis mechanism of my invention in the normal and pre-operated position.

Referring to the drawing, and in particular to Fig. 1, the baby carriage 20 comprises essentially an undercarriage or chassis 21 to which the carriage body 22a is connected by the usual cross-support arms 22 and 23. The chassis 21 consists of spaced tubular side members 24 extending longitudinally and having reversely bent end portions 25. Links 26 and 27 pivotally connecting the ends of each side member to the adjacent ends of the support arms 22 and 23 secure the body 22a to the chassis 21. Diagonal braces 28 and 29 maintain the side members in spaced position. A rectangular center piece 30 is secured to the braces 28 and 29 reinforcing and imparting rigidity to the chassis.

Front wheels 31 and rear wheels 32 are connected to the chassis 21 for movement between a raised position and a lowered position. Front wheels 31 are mounted on an axle 33 which rides in transversely spaced, slotted, vertical guideways 34 and the rear wheels 32 are similarly mounted on axle 35 which rides in transversely spaced vertical guideways 36. Cylinder and piston dash-pot assemblies 37 operatively connect the wheel axles to the chassis; a pair of dash-pot assemblies 37 being connected to each axle 33 and 35. As best seen in Fig. 3, the pistons 38 of the front wheel dash-pot assemblies 37 are connected to a transversely extending inverted U-shaped brace 39, the depending leg portions 40 of which are connected to the respective side members 24. The cylinders 41, which are in sliding, telescoping, relationship to their respective pistons 38, have their lower ends fixed to axle 33. The rear wheel piston and cylinder assemblies 37 are similarly secured to transversely extending rear brace 42 (Figs. 2 and 4) and rear axle 35. The piston and cylinder assemblies 37 may be either hydraulically or pneumatically operated. The purpose of the piston and cylinder is to cushion the drop of the carriage in rolling from a higher elevation to a lower elevation to prevent jarring the occupant, as shown in Figs. 1, 6 and 7.

Figure 2:
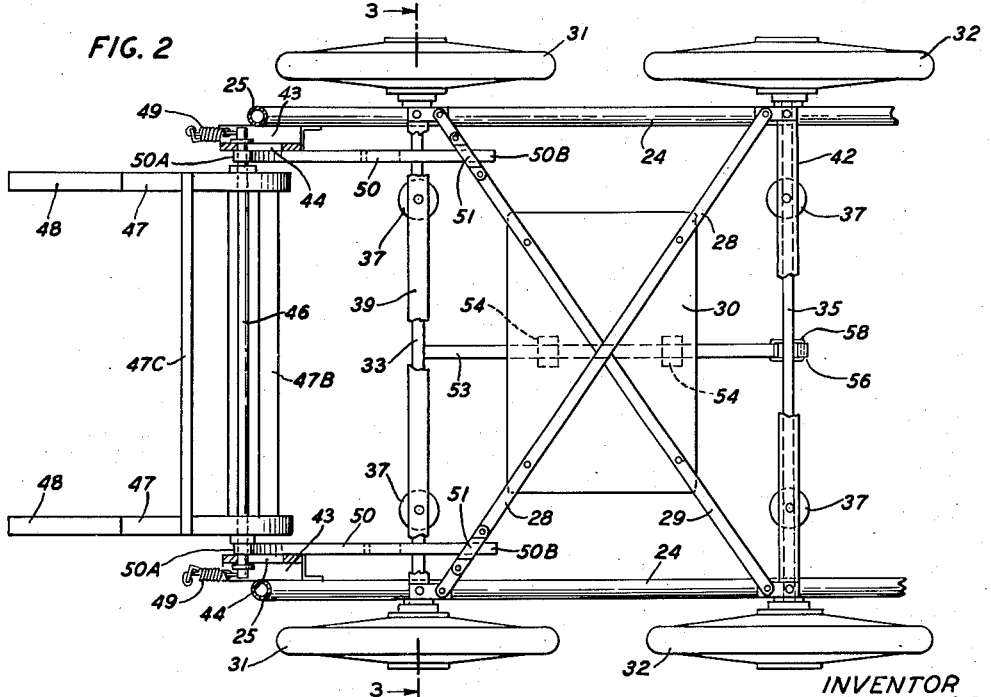
Fig. 2 is a sectional plan view taken along line 2—2 of Fig. 1.
Figure 2:

Connected to the front end of each longitudinal side member 24 (see Figs. 1, 5 and 9) is a bracket 43 defining a substantially horizontal elognated aperture 44 and having a forwardly projecting finger portion 45. A shaft 46, having secured thereto a pair of spaced, identical bumper cams 47, is slidably and rotatably supported in the elongated apertures 44 of the transversely aligned brackets 43. The bumper cams 47, shaped substantially as shown, are eccentrically supported on and fixed to the shaft 46 so that the radial distance between the axis of rotation and noses 47A of the cams is slightly less than the radius of front wheels 31. Extending about a peripheral portion of each cam 47, including the nose thereof, is a strip 48 of non-skid material such as rubber or other suitable material. A pair of bars 47B and 47C, on opposite radial sides of shaft 45, interconnect the two cams 47, one of the bars, for example bar 47B, being of such weight to act as a counterweight for the cams and normally bias them to take the position shown in Fig. 1. A tension spring 49 connects shaft 46 to projecting bracket finger 45 to normally bias bumper cams 47 toward their preoperated position and whereby the shaft 46 is positioned at the extreme front end of the elongated aperture 44 when the carriage is in normal rolling position as shown in Figs. 1 and 2.

Connected to cam shaft 46 and actuated by the rearward displacement or sliding movement thereof are means for releasably locking the front wheels in the up-position. The front wheel locking means consist of a pair of spaced sliding operators 50. The sliding operators are provided with a looped front end portion 50A adapted to embrace cam shaft 46 so that the latter is forced to rotate, and a rear end portion 50B slideable in guides 51 supported on braces 28 and 29. Connected to each operator 50 intermediate its ends is a catch piece 52 adapted to slide under front wheel axle 33 when the operators are actuated rearwardly and thereby lock the front wheels in the elevated position, as shown in Figures 4 and 5. In the normal, preoperated position, catch piece 52 is positioned forward of front axle 33 so that the front wheels are free to drop by gravity in the event the front wheels roll over a curb, as in Fig. 5.

According to my invention, means actuated by the front wheel axle 33 releasably lock the rear wheels 32 in the elevated position. The rear wheel locking means includes an elongated latching member 53 slidably mounted in guideways 54 on the bottom face of center piece 30, the front end of the elongated latching member being provided with a reversely bent, downwardly inclined surface 55. A spring biased catch 56 is connected to the back end of latching member 53. Referring to Fig. 8, catch 56 comprises a fixed leg portion 56A connected to the depending end portion 53A of the latching member, and a leg portion 56B pivotally connected to fixed leg portion 56A. A spring 57 normally biases the pivoted leg portion 56B in clockwise direction. A wire loop 58 linked to the free end of pivoted leg portion 56B and encircling depending end portion 53A, limits the clockwise movement of spring loaded leg portion 56B and also forms the stop for maintaining rear axle 35 locked in the raised position. Normally urging latching member 53 toward its most forwardly position is a spring 59 which connects elongated latching member 53, at a rearward portion thereof, to the forward one of the guideways 54. Thus it will be apparent that the front wheel axle contacting the inclined surface 55, as the front wheels move from their lowermost position to the higher position, pushes elongated latching member 53 rearwardly. This causes spring latch 56 to releasably lock the rear axle 35 in the elevated position. As pivoted leg 56B is free to pivot toward fixed leg portion 56A as the latter is pushed rearwardly by end projection 53A, it will be apparent that, if for any reason the rear axle 35 is slow in moving from the lowered to the elevated position, thereby allowing latching member 53 to override the axle, pivoted leg portion 56B of latch 56, being spring loaded, will permit the rear axle to cam pivoted leg 56B in the counterclockwise direction so that the rear axle may readily override the spring latch. With the rear axle in the elevated position, pivoted leg 56B is caused to spring to its original position, whereupon the wire loop releasably locks the rear axle in the elevated position.

The operation of the chassis mechanism is as follows:

With the carriage in its normal rolling position over level ground, as in Figure 1, the bumper cams 47 are normally biased to their preoperated position with the shaft 46 connected thereto being at the front end of the slotted opening 44, and the radius connecting the radially most distant point of the cam nose 47 and the center of shaft 46 being inclined slightly from the horizontal so that such most distant point of the cam nose and periphery lies above the shaft center, thereby avoiding the possibility of a dead center effect. The slidable operators 50 are in non-locking position of the front wheels so that the latter are free to drop by gravity in the event they are rolled down a sidewalk curb, as shown in Figure 6. With the front wheels in their normal elevated position, the front axle 33 is in engagement with the elongated latching member 53, thereby forcing it rearwardly so that the spring latch 56 locks the rear axle and wheels in their elevated position (Figure 1).

As the carriage is rolled against a curb 70, the initial impact of the bumper cams thereagainst causes the cam shaft 46 to slide rearwardly in slot 44, the rearward displacement of the cam shaft effecting displacement of slide operators 50, causing the catch pieces 52 to lock the wheels in the up-position, as in Figs. 4 and 5. The rear wheels 32 are already normally locked by latch 53 in the normal rolling position, Figs. 1 and 5.

As the operator continues to push the carriage against curb 70, nose portion 47A of the cam overrides the curb, and the frictional resistance thereof with the curb causes the cam to rotate eccentrically about its axis. In doing so the front end of the carriage is automatically raised to the level of the curb, as shown in Fig. 5, and as the front wheels are locked in the up-position these are simultaneously raised with the front end of the chassis. Thus, to maintain the chassis substantially horizontal the operator with only a minimum of effort lifts the rear end of the carriage, the front being supported on the curb, Fig. 5.

As the front wheels reach the sidewalk level of curb 70, front wheels 31, being of greater radius than the radial distance between cam shaft 46 and cam nose 47A, allow the counter-weighted cams automatically to return to their normal preoperated position. By so doing, the slide operators are likewise returned to their preoperated position, thus freeing the front wheels so that they may drop to their lower position, rear wheels 32 remaining locked. The chassis parts are thus again in normal level rolling position.

When the carriage is rolled off a curb 70, as in Fig. 6, the front wheels 31 being free to drop, do so. In doing so, the piston and cylinder assemblies 37 cushion the wheel drop. As the front wheel axle drops in guideways 34, the rear wheel locking latch 53 is urged forward by spring 59, thus allowing the catch 56 to release the rear axle 35. Thus, as the rear wheels are rolled over the curb 70, they are likewise free to drop to their lower position, as in Fig. 7, it being noted that the chassis remains horizontal without any effort on the part of the propellant of the carriage.

With the front and rear wheels disposed at their lower position, the weight of the carriage, resisted by the action of the dash-pot assemblies 37 cushions the lowering of the carriage body as the various parts assume their normal rolling position, as in Fig. 1. In doing so, the front axle 33, as it engages inclined surface 55, causes latching member 53 to be displaced rearwardly, allowing catch 56 to releasably lock rear wheels 32 in elevated position.

In the event latch 53 is urged to the rear before rear axle 35 reaches its uppermost position, the catch 56 will allow the rear axle to override it by a camming action which will cause pivotable leg 56B to be displaced, permitting the rear axle to reach its uppermost position. As the axle passes catch 56, spring 57 returns leg 56B to its normal position and the wire loop 58 connected thereto forming the axle stop. Again the carriage is in normal rolling position.

From the foregoing operation it will be noted that in ascending or descending a curb the chassis mechanism of my invention is entirely automatic in operation. No lever or other manually operated means is required to be actuated to render the mechanism operative. Also novel are the piston and cylinder wheel connections which cushion the carriage in descending a curb.

In order to insure more positive operation, the slot 44 in bracket 43 is provided with a notch or recessed portion 44A in the upper edge and to the rear thereof as best seen in Fig. 9. With this construction it will be noted that when the bumper cams 47 strike a curb or engage the elevated sidewalk, cam axle 46 is first pushed back in slots 44 (Figure 4) in opposition to the tension of springs 49, and then enters notches 44A, as shown in Figures 5 and 9, and is thus positively retained therein as long as the cams 47 are supporting the weight of the carriage, as in Figure 5. The positive retention of cam shaft 46 in notches 44A as just described, will insure that the front wheels remain locked in the elevated position until they are positioned upon the elevated surface. When the front wheels are in definite engagement with the elevated surface, the weight of the carriage is shifted from cams 47 to wheels 31. As the weight of the carriage is removed from the cams, the latter restore to their normal preoperated position due to their counterweighting and as the result of the springs 49 returning the cam shaft 46 to the front end of slots 44, as shown in Figures 1 and 2.

While the instant invention has been disclosed with reference to a particular embodiment thereof, the invention is not limited to the details of such embodiment which has been described by way of illustration only, and in no way as a limitation. Modifications and variations thereof will readily occur to the skilled worker in the art without departing from the spirit and scope of my invention.

What I claim is:

1. A wheeled vehicle for riding up and down sidewalk curbs and the like comprising a chassis, a front and a rear axle, means interconnecting the chassis and each axle for relative movement of the axle to an elevated and a lowered position, a pair of wheels of predetermined radius on each axle, a cam at the front of the chassis of a maximum radius less than the predetermined wheel radius and so weighted that normally its peripheral region at the maximum radius extends forwardly of the chassis, a shaft integral with the cam, an elongated slot defined in the chassis rotatably supporting the cam shaft, means biasing the shaft toward the forward end of the slot, the cam being adapted on forward propulsion of the vehicle to engage a curb to displace the cam shaft to the rearmost portion of the slot and to rotate about the shaft to raise the front of the chassis above the upper face of the curb, a normally unlatched first locking means displaceable rearwardly with the cam shaft, a catch on the first locking means for engaging the front axle on such displacement to lock the front axle in its elevated position, an elongated member having a second locking means at its rearward end region, and a spring biasing the elongated member forwardly so that when the front axle is in its elevated position the forward end of the elongated member is braced against the front axle and the second locking means maintains the rear axle in its elevated position while when the front axle is at any position below its elevated position the forward region of the elongated member under the spring bias passes over the front axle sufficiently to displace the second locking means as to permit the rear axle to drop to its lowered position.

2. The wheeled vehicle according to claim 1 in which the means interconnecting the chassis and each axle is at least one piston and cylinder dashpot assembly of which the cylinder is integrally attached to the axle and the piston to the chassis so that with the front axle unlatched by the first locking means on restoration of the cam after a curb has been mounted the front axle may fall by gravity to its lowered position on descending a curb thereby unblocking the elongated member to unlatch the second locking means to permit the rear axle likewise to drop by gravity to its lowered position when its wheels pass the curb, both axles restoring uniformly after the descent to their elevated positions with the chassis horizontal under the weight of the chassis.

3. The wheeled vehicle according to claim 1 in which the elongated member has an inclined leading surface.

4. The wheeled vehicle according to claim 3 in which the second locking means at the trailing end of the elongated member consists of spring biased catch having an upwardly and outwardly inclined face to the upper end region of which a loop is hinged, the loop encircling a downward portion of the trailing end, to permit locking of the rear axle in its elevated position even when the forward end of the elongated member is braced against the front axle and is in the rear axle locking position before the rear axle is in its fully elevated position.

5. A wheeled vehicle according to claim 1 in which the means biasing the shaft toward the forward end of the elongated slot is a second spring connected to the front end of a bracket supported on the chassis, a recess is formed in the upper face of the rearward end of the elongated aperture, and the direction of the tension of the spring biasing the cam shaft is such as to force the shaft into the recess on rearward movement of the cam shaft.

6. A wheeled vehicle adapted to ride up and down curbs or the like, comprising a chassis, a front set of wheels and a rear set of wheels connected to the chassis for movement between a raised position and a lowered position, rotatable bumper means having a maximum radius less than that of the front wheels connected to the front of the chassis, the bumper means being adapted to engage a curb in advance of the front wheels on forward propulsion of the carriage and to move rearwardly on continued forward propulsion, a first means locking the front wheels in their elevated position on completion of the rearward displacement of the bumper means, the bumper means on rotation under the forward propulsion raising the front of the chassis to above the level of the curb to engage the front wheels to the upper face of the curb, and a second locking means including a member extending to the first locking means for locking the rear set of wheels in the raised position when the front set of wheels is in the elevated position and biased in the direction for unlatching the front set of wheels.

7. A wheeled vehicle according to claim 6 in which the connection between the wheels and the chassis is by means including at least one dashpot vertically above the axle of each set of wheels of which dashpot the lower end is connected to the axle, and a U-shaped guide open at the top and closed at its bottom of a length somewhat less than the diameter of the wheels, the upper end of each guide being attached to an arcuate spring attached to the chassis, so that when the set of wheels have dropped on descending a curb to its lowered position, the chassis gradually sinks to the position at which the sets of wheels are in their raised position.

References Cited in the file of this patent

UNITED STATES PATENTS

| | | |
|---|---|---|
| 1,785,646 | Pascoo | Dec. 16, 1930 |
| 2,087,069 | Pascolesco | July 13, 1937 |
| 2,361,544 | Hastings | Oct. 31, 1944 |
| 2,372,585 | Klumb | Mar. 27, 1945 |
| 2,418,665 | Rizzuto | Apr. 8, 1947 |

FOREIGN PATENTS

| | | |
|---|---|---|
| 56,640 | France | July 23, 1952 |
| 849,057 | France | Aug. 7, 1939 |
| 926,864 | France | Apr. 21, 1947 |
| 200,211 | Switzerland | Jan. 2, 1939 |